(12) United States Patent
Hongo et al.

(10) Patent No.: US 7,589,130 B2
(45) Date of Patent: Sep. 15, 2009

(54) COATING COMPOSITION, COATING FILM, METHOD OF MANUFACTURING COATING FILM, AND OPTICAL RECORDING MEDIUM

(75) Inventors: Yuki Hongo, Tokyo (JP); Satoru Shoshi, Koshigaya (JP); Hideo Senoo, Kawaguchi (JP); Takeshi Yamasaki, Tokyo (JP); Tomomi Yukumoto, Tokyo (JP)

(73) Assignees: Lintec Corporation, Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 11/194,756

(22) Filed: Aug. 2, 2005

(65) Prior Publication Data

US 2006/0044993 A1    Mar. 2, 2006

(30) Foreign Application Priority Data

Aug. 10, 2004    (JP)    ............................. 2004-233427

(51) Int. Cl.
*B29C 71/04*    (2006.01)
(52) U.S. Cl. ........................................ 522/71; 524/731
(58) Field of Classification Search ................. 524/731; 522/71
See application file for complete search history.

(56) References Cited

U.S. PATENT DOCUMENTS 5,945,462 A * 8/1999 Salamon ...................... 522/37

FOREIGN PATENT DOCUMENTS

| EP | 0-123-223 | 10/1984 |
|---|---|---|
| GB | 2-328-071 A | 2/1999 |
| JP | 59-059492 A | 4/1984 |
| JP | 2002-245672 A | 8/2002 |
| WO | WO-97-14142 A | 4/1997 |
| WO | WO-2004-010427 | 1/2004 |

OTHER PUBLICATIONS

EPO Search Report issued on Nov. 23, 2006 in corresponding EP patent application No. EP 05 25 4986.

* cited by examiner

*Primary Examiner*—Kuo-Liang Peng
(74) *Attorney, Agent, or Firm*—Posz Law Group, PLC

(57) ABSTRACT

A coating composition containing a solvent and a coating agent having an ionizing radiation-curable compound as a principal component thereof, wherein under the following condition for the concentration a (wt %) of the coating agent in the coating composition $$0 < a \leq 60,$$

the concentration a of the coating agent and the surface tension b (dyne/cm) of the coating composition satisfy the following relationship $$b \leq (-a/15) + 26,$$

is applied onto a surface of a protective film 11 and curing is carried out to form a hard coating layer 12. Even in the case that projections or foreign bodies are present on the surface of the protective film 11, the hard coating layer 12 can conceal these and hence can have high surface smoothness.

1 Claim, 2 Drawing Sheets

COATING COMPOSITION, COATING FILM, METHOD OF MANUFACTURING COATING FILM, AND OPTICAL RECORDING MEDIUM

TECHNICAL FIELD

The present invention relates to a coating composition, a coating film, a method of manufacturing a coating film, and an optical recording medium, and in particular relates to a coating composition and a method of manufacturing a coating film according to which a highly smooth surface can be formed, and a coating film and an optical recording medium having high surface smoothness.

BACKGROUND ART

With Blu-ray Discs, which are next-generation optical discs, as with ordinary optical discs, a protective film comprising a polycarbonate resin for protecting an information recording layer is bonded to the information recording layer; however, Blu-ray Discs have a very high capacity and high density of recorded information, and hence errors may occur in reading or writing of information if the protective film is damaged even only slightly, and thus the present state of affairs is that Blu-ray Discs are handled while housed in a cartridge.

However, to make Blu-ray Discs more compact as media and to reduce the manufacturing cost, cartridge-less bare discs are desired.

Therefore, forming a hard coating layer 12P on the protective film 11 for the information recording layer has, for example, been proposed as shown in FIG. 4 (Japanese Patent Application Laid-open No. 2002-245672).

The protective film 11 for a Blu-ray Disc or the like is generally manufactured by casting a solution that has been obtained by diluting a polycarbonate resin with a solvent onto a belt to form a film, but projections 10 may be formed on the surface of the protective film 11 manufactured.

In the case of forming a hard coating layer 12P on the surface of a protective film 11 having projections 10 thereon as described above, defects arise in the surface of the hard coating layer 12P nucleated by the projections 10, leading to deterioration of signal characteristics.

Moreover, when forming the hard coating layer 12P, in the case that foreign bodies such as dust or the like are attached to the surface of the protective film 11 and a coating agent for the hard coating layer 12P is applied on in this state, a similar problem arises.

DISCLOSURE OF THE INVENTION

The present invention has been accomplished in view of the above state of affairs; it is an object of the present invention to provide a coating composition and a method of manufacturing a coating film according to which, even in the case that projections or foreign bodies are present on a surface to be coated, these can be concealed and hence a highly smooth surface can be formed, and a coating film and an optical recording medium having high surface smoothness.

To attain the above object, the present invention firstly provides a coating composition containing a coating agent having an ionizing radiation-curable compound as a principal component thereof, the coating composition characterized in that under the following condition for the concentration a (wt %) of the coating agent in the coating composition $$0 < a \leq 60,$$

the concentration a of the coating agent and the surface tension b (dyne/cm) of the coating composition satisfy the following relationship $$b \leq (-a/15) + 26 \qquad \text{(invention 1)}.$$

According to the above invention (invention 1), even in the case that projections or foreign bodies are present on a surface to be coated, these can be concealed and hence a highly smooth surface can be formed.

In the case of the above invention (invention 1), the coating agent preferably contains at least one selected from dimethylsiloxane compounds and fluoro compounds (invention 2); in the case of containing a dimethylsiloxane compound, the content thereof is preferably 0.5 to 50 wt % (invention 3), and in the case of containing a fluoro compound, the content thereof is preferably 0.1 to 20 wt % (invention 4).

According to the above inventions (inventions 2 to 4), it becomes easy to give the coating composition a surface tension satisfying the above-mentioned relationship.

The present invention secondly provides a coating film comprising a resin film, and a coating layer obtained by applying a coating composition as above (inventions 1 to 4) onto at least one surface of the resin film and performing curing (invention 5).

With the coating film according to the above invention (invention 5), because the coating layer is formed using a coating composition as above, even in the case that projections or foreign bodies are present on the surface of the resin film on which the coating layer is formed, these can be concealed by the coating layer, and hence a high surface smoothness can be obtained.

In the case of the above invention (invention 5), in the case that projections are present on the surface of the resin film on which the coating layer is formed, and the maximum height of the projections is h (μm), the thickness d (μm) of the coating layer preferably satisfies the following condition $$d \geq h + 1 \qquad \text{(invention 6)}.$$

According to the above invention (invention 6), the projections can be reliably concealed by the coating layer, and hence a very high surface smoothness can be obtained.

In the case of the above inventions (inventions 5 and 6), an adhesive layer may be provided on the surface of the resin film on which the coating layer is not formed (invention 7).

In the case of the above inventions (inventions 5 to 7), the resin film may comprise a material having a polymethyl methacrylate resin, a polycarbonate resin or a cycloolefin resin as a principal component thereof (invention 8); such a coating film is suitable as a protective layer in an optical recording medium.

The present invention thirdly provides a method of manufacturing a coating film, comprising forming a coating layer by applying a coating composition that has been obtained by adjusting the concentration of a coating agent therein having an ionizing radiation-curable compound as a principal component thereof onto a surface of a resin film and performing curing, the method of manufacturing a coating film characterized in that the coating composition is prepared such that under the following condition for the concentration a (wt %) of the coating agent in the coating composition $$0 < a \leq 60,$$

the concentration a of the coating agent and the surface tension b (dyne/cm) of the coating composition satisfy the following relationship $$b \leq (-a/15) + 26 \qquad \text{(invention 9)}.$$

According to the above invention (invention 9), even in the case that projections or foreign bodies are present on the surface of the resin film on which the coating layer is formed, these can be concealed by the coating layer, and hence a coating film having high surface smoothness can be obtained.

In the case of the above invention (invention 9), the coating layer is preferably formed such that in the case that projections having a maximum height of h (μm) are present on the surface of the resin film on which the coating layer is formed, the thickness d (μm) of the coating layer satisfies the following condition $d \geq h+1$          (invention 10).

According to the above invention (invention 10), the projections can be reliably concealed by the coating layer, and hence a coating film having very high surface smoothness can be obtained.

The present invention fourthly provides an optical recording medium comprising a coating film as above (inventions 5 to 8) or a coating film obtained using a method of manufacturing a coating film as above (inventions 9, 10) (invention 11).

The optical recording medium according to the above invention (invention 11) has high surface smoothness due to the coating layer, and hence there is no deterioration of signal characteristics due to projections on the resin film, and thus the error rate is very low.

EFFECTS OF THE INVENTION

According to a coating composition or a method of manufacturing a coating film of the present invention, even in the case that projections or foreign bodies are present on a surface to be coated, these can be concealed and hence a highly smooth surface can be formed. Moreover, a coating film or an optical recording medium of the present invention is able to have high surface smoothness even in the case that projections or foreign bodies are present on a surface to be coated with a coating layer.

BEST MODE FOR CARRYING OUT THE INVENTION

Figure 1:
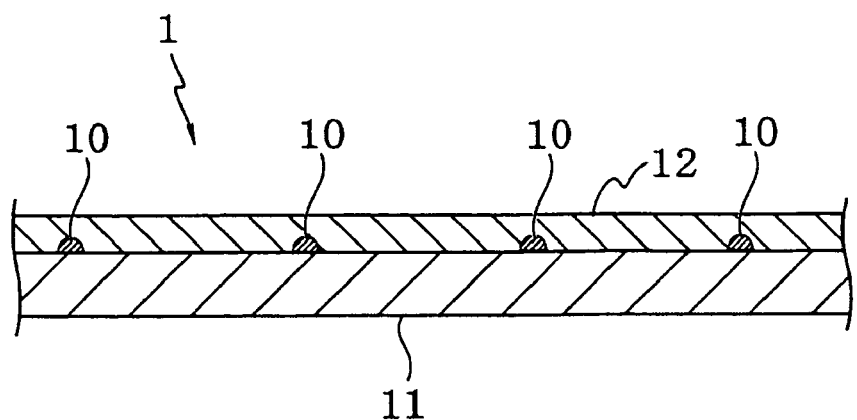
FIG. 1 is a sectional view of a hard coating film according to an embodiment of the present invention.

Following is a description of embodiments of the present invention.

Coating Composition

A coating composition according to the present embodiment contains a coating agent having an ionizing radiation-curable compound as a principal component thereof.

Examples of the ionizing radiation-curable compound are a photopolymerizable prepolymer and/or a photopolymerizable monomer. As photopolymerizable prepolymers, there are radical polymerization type ones and cationic polymerization type ones; examples of radical polymerization type photopolymerizable prepolymers include polyester acrylate type, epoxy acrylate type, urethane acrylate type, and polyol acrylate type ones.

A polyester acrylate type prepolymer can be obtained, for example, by esterifying with (meth) acrylic acid the hydroxyl groups of a polyester oligomer having a hydroxyl group at each end thereof obtained through condensation between a polyfunctional carboxylic acid and a polyhydric alcohol, or by esterifying with (meth) acrylic acid the hydroxyl groups at the ends of an oligomer obtained by adding an alkylene oxide to a polyfunctional carboxylic acid.

An epoxy acrylate type prepolymer can be obtained, for example, by esterifying by reacting (meth) acrylic acid with the oxirane rings of a bisphenol type epoxy resin or a novolak type epoxy resin of relatively low molecular weight.

A urethane acrylate type prepolymer can be obtained, for example, by esterifying with (meth)acrylic acid a polyurethane oligomer obtained through reaction between a polyether polyol or a polyester polyol and a polyisocyanate.

A polyol acrylate type prepolymer can be obtained by esterifying with (meth)acrylic acid the hydroxyl groups of a polyether polyol.

As a cationic polymerization type photopolymerizable prepolymer, an epoxy resin is generally used. Examples of such epoxy resins include compounds obtained by epoxidizing a polyhydric phenol such as bisphenol resins and novolak resins with epichlorohydrin or the like, and compounds obtained by oxidizing a straight chain olefin compound or a cyclic olefin compound with a peroxide or the like.

One photopolymerizable prepolymer as above can be used alone, or two or more can be used in combination.

Examples of photopolymerizable monomers, on the other hand, include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl) isocyanurate, pentaerythritol tetraacrylate, propionic acid-modified dipentaerythritol penta(meth)acrylate, dipentaerythritol hexa(meth)acrylate, and caprolactone-modified dipentaerythritol hexa(meth)acrylate.

One photopolymerizable monomer as above can be used alone, or two or more can be used in combination; moreover, such a photopolymerizable monomer may be used in combination with a photopolymerizable prepolymer as described above.

In addition to an ionizing radiation-curable compound as described above, the coating agent may as desired contain a photopolymerization initiator, a filler, or another ionizing radiation-curable compound.

As a photopolymerization initiator, for a radical polymerization type photopolymerizable prepolymer or photopolymerizable monomer, for example benzoin, benzoin methyl ether, benzoin ethyl ether, benzoin isopropyl ether, benzoinn-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholinopropane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoate ester or the like, or a high-molecular-weight photopolymerization initiator such as oligo{2-hydroxy-2-methyl-1[4-(1-methylvinyl)phenyl]propanone}, or the like can be used.

Moreover, for a cationic polymerization type photopolymerizable prepolymer, for example a compound comprising an onium such as an aromatic sulfonium ion, an aromatic oxosulfonium ion or an aromatic iodonium ion and an anion such as tetrafluoroborate, hexafluorophosphate, hexafluoroantimonate or hexafluoroarsenate, or the like can be used.

One photopolymerization initiator as above can be used alone, or two or more can be used in combination. The amount added of the photopolymerization initiator is generally 0.2 to 10 parts by weight per 100 parts by weight of the total amount of the photopolymerizable prepolymers and photopolymerizable monomers.

As a filler, for example inorganic fine particles can be used to adjust the refractive index of the coating layer obtained and increase the cured strength of the film. Examples of such inorganic fine particles include silicon dioxide particles, titanium dioxide particles, aluminum oxide particles, tin oxide particles, calcium carbonate particles, barium sulfate particles, talc, kaolin, and calcium sulfate particles; the mean particle diameter thereof is preferably not more than 0.5 μm. Moreover, the inorganic fine particles may be surface-treated to improve the stability thereof in the coating composition and strengthen the coating layer.

Moreover, to increase the refractive index of the coating layer obtained, fine particles comprising at least one oxide of a metal selected from titanium, aluminum, indium, zinc, tin and antimony, for example fine particles of $TiO_2$, $Al_2O_3$, $In_2O_3$, $ZnO$, $SnO_2$, $Sb_2O_3$, ITO or the like, wherein the particle diameter is not more than 100 nm, preferably not more than 50 nm, can be used as a filler. Such metal oxide fine particles have a particle diameter sufficiently smaller that the wavelength of light, and hence scattering of light is not brought about, and thus a dispersion (coating layer) having the metal oxide fine particles dispersed therein will behave as an optically uniform substance.

The amount added of the above inorganic fine particles (metal oxide fine particles) is preferably 10 to 90 wt % of the coating agent.

Furthermore, to improve the hardness of the coating layer obtained and thus give the coating layer scratch-preventing performance, reactive particles, for example reactive particles as described in Japanese Patent Application Laid-open No. 2000-273272, can be used as an ionizing radiation-curable compound. Such reactive particles comprise inorganic oxide particles having chemically bonded thereto an organic compound (a) having at least one polymerizable unsaturated group in the molecule thereof.

Examples of the inorganic oxide particles in the reactive particles are particles of silica, alumina, zirconia, titaniumoxide, zincoxide, germaniumoxide, indiumoxide, tinoxide, antimonyoxide, cerium oxide or the like; one of these can be used alone, or two or more can be used in combination.

In the case of using the coating composition to form a coating layer (hard coating layer) on an optical film, an optical product or the like, it is preferable to use silica particles, which absorb little light and have high optical transparency, as the inorganic oxide particles.

The mean particle diameter of the inorganic oxide particles is preferably 0.001 to 2 μm, particularly preferably 0.001 to 0.2 μm, yet more preferably 0.001 to 0.1 μm. If the mean particle diameter of the inorganic oxide particles exceeds 2 μm, then the optical transparency of the coating layer obtained upon curing the coating composition may drop, and the surface smoothness of the coating layer may be poor.

The form of the inorganic oxide particles may be any of spherical, hollow, porous, rod-like, plate-like, fiber-like, irregular-shaped and so on, but is particularly preferably spherical.

The specific surface area (the specific surface area according to a BET method using nitrogen) of the inorganic oxide particles is preferably 10 to 1000 $m^2/g$, particularly preferably 100 to 500 $m^2/g$.

Examples of the polymerizable unsaturated group possessed by the organic compound (a) bonded to the inorganic oxide particles include an acryloyl group, a methacryloyl group, a vinyl group, a propenyl group, a butadienyl group, a styryl group, an ethynyl group, a cinnamoyl group, a maleate group, and an acrylamide group.

There are no particular limitations on the number of polymerizable unsaturated groups in the organic compound (a) so long as this number is at least one per molecule, but this number is generally 1 to 4.

In addition to such a polymerizable unsaturated group, the organic compound (a) preferably contains a group represented by the formula —X—C(=Y)—NH— (in the formula, X is NH, O or S, and Y is O or S). Moreover, the organic compound (a) is preferably a compound having a silanol group in the molecule thereof, or a compound in which a silanol group is produced upon hydrolysis.

A preferable specific example of such an organic compound (a) is, for example, a compound represented by undermentioned formula (1).

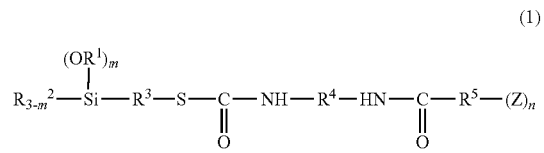

In formula (1), $R^1$ and $R^2$ are each a hydrogen atom or an alkyl group or aryl group having 1 to 8 carbon atoms, and may be the same or different. Examples of such a functional group include a methyl group, an ethyl group, a propyl group, a butyl group, an octyl group, a phenyl group, and a xylyl group.

Examples of the group represented by the formula $(R^1O)_m R^2_{3-m}Si$— include, for example, a trimethoxysilyl group, a triethoxysilyl group, a triphenoxysilyl group, a methyldimethoxysilyl group, and adimethylmethoxysilyl group; out of these, a trimethoxysilyl group, a triethoxysilyl group or the like is preferable. Here, m is an integer from 1 to 3.

$R^3$ is a bivalent organic group having an aliphatic or aromatic structure with 1 to 12 carbon atoms, and may contain a chain, branched or cyclic structure. Examples of such an organic group include a methylene group, an ethylene group, a propylene group, a butylene group, a hexamethylene group, a cyclohexylene group, a phenylene group, a xylylene group, and a dodecamethylene group; out of these, a methylene group, a propylene group, a cyclohexylene group, a phenylene group or the like is preferable.

$R^4$ is a bivalent organic group, and is generally selected from bivalent organic groups having a molecular weight of 14 to 10,000, preferably 76 to 500. Examples of such bivalent organic groups are chain polyalkylene groups such as hexamethylene, octamethylene and dodecamethylene, alicyclic and multi-ring bivalent organic groups such as cyclohexylene and norbornylene, bivalent aromatic groups such as phenylene, naphthylene, biphenylene and polyphenylene, and alkyl group-substituted or aryl group-substituted derivatives of the above. Such a bivalent organic group may contain atomic groups containing atoms other than carbon and hydrogen atoms, and moreover may contain polyether linkages, polyester linkages, polyamide linkages or polycarbonate linkages, or groups represented by the formula —X—C(=Y)—NH— (in the formula, X represents NH, O or S, and Y represents O or S).

$R^5$ is an organic group of valency n+1, and is preferably selected from chain, branched and cyclic saturated hydrocarbon groups and unsaturated hydrocarbon groups. Here, n is preferably an integer from 1 to 20, particularly preferably 1 to 10, yet more preferably 1 to 5.

Z is a monovalent organic group having in the molecule thereof a polymerizable unsaturated group that is able to undergo an intermolecular crosslinking reaction under the presence of an active radical species. Examples of such organic groups include an acryloyl(oxy) group, amethacryloyl(oxy) group, avinyl(oxy) group, apropenyl(oxy) group, abutadienyl(oxy) group, astyryl(oxy) group, an ethynyl(oxy) group, a cinnamoyl(oxy) group, a maleate group, an acrylamide group, and a methacrylamide group; out of these, an acryloyl (oxy) group and a methacryloyl (oxy) group are preferable.

The reactive particles can be manufactured by reacting the inorganic oxide particles and the organic compound (a) together. It is thought that a component able to react with the organic compound (a) is present on the surface of the inorganic oxide particles, and hence by mixing together the organic compound (a) and the inorganic oxide particles in the form of a powder or a solvent dispersion sol of the inorganic oxide particles either under or not under the presence of water, and heating and stirring, the surface component of the inorganic oxide particles and the organic compound (a) can be reacted together, whereby the reactive particles are obtained.

The content (in terms of solids) of the reactive particles in the coating agent is preferably 5 to 80 wt %, particularly preferably 10 to 70 wt %.

If the content of the reactive particles is less than 5 wt %, then the hardness of the coating layer obtained may be insufficient, whereas if the content of the reactive particles exceeds 90 wt %, then the curability of the coating composition may become poor.

The coating agent in the present embodiment preferably contains a dimethylsiloxane compound and/or a fluoro compound so that the coating composition can have a surface tension as described later.

Examples of a dimethylsiloxane compound include a mercapto-modified polydimethylsiloxane, a phenol-modified polydimethylsiloxane, a polyether-modified polydimethylsiloxane, a fatty acid ester-modified polydimethylsiloxane, a (meth)acrylate-modified polydimethylsiloxane, and a silicone graft acrylic resin having a dimethylsiloxane skeleton.

The content of the dimethylsiloxane compound in the coating agent is preferably 0.5 to 50 wt %, particularly preferably 0.5 to 5 wt %.

Examples of a fluoro compound include compounds having a fluoroalkyl group such as fluoroalkyl carboxylates, fluoroalkyl quarternary ammonium salts and fluoroalkyl ethylene oxide adducts, compounds having a perfluoroalkyl group such as perfluoroalkyl carboxylates, perfluoroalkyl quarternary ammonium salts and perfluoroalkyl ethylene oxide adducts, compounds having a fluorocarbon group, tetrafluoroethylene polymers, copolymers between vinylidene fluoride and tetrafluoroethylene, copolymers between vinylidene fluoride and hexafluoropropylene, fluorine-containing (meth) acrylic acid esters, fluorine-containing (meth)acrylic acid ester polymers, fluorine-containing (meth) acrylic acid alkyl ester polymers, and copolymers between fluorine-containing (meth) acrylic acid esters and other monomers.

The content of the fluoro compound in the coating agent is preferably 0.5 to 20 wt %, particularly preferably 0.5 to 5 wt %.

The coating composition according to the present embodiment preferably contains a solvent, whereby it becomes easy to make the concentration of the coating agent and the surface tension of the coating composition satisfy the relationship described later. There are no limitations on the solvent in the present embodiment so long as the solvent can dissolve the ionizing radiation-curable compound in the coating agent and does not have adverse effects on the object coated; for example, the solvent used can be selected as appropriate from alcohols such as methanol, ethanol, isopropanol, isobutanol and octanol, ketones such as acetone, methyl ethyl ketone, methyl isobutyl ketone and cyclohexanone, esters such as ethyl acetate, butyl acetate, ethyl lactate and γ-butyrolactone, ethers such as ethylene glycol monomethyl ether (methyl cellosolve), ethylene glycol monoethyl ether (ethyl cellosolve), diethylene glycol monobutyl ether (butyl cellosolve) and propylene glycol monomethyl ether, aromatic hydrocarbons such as benzene, toluene and xylene, and amides such as dimethylformamide, dimethylacetamide and N-methylpyrrolidone.

In addition to the above components, the coating agent in the present embodiment may contain any of various additives such as antioxidants, ultraviolet absorbents, light stabilizers, silane coupling agents, age resisters, thermal polymerization inhibitors, colorants, leveling agents, surfactants, storage stabilizers, plasticizers, lubricants, organic fillers, fillers, wettability improvers, and coating surface improvers.

For the coating composition according to the present embodiment, under the following condition for the concentration a (wt %) of the coating agent in the coating composition $$0 < a \leq 60,$$

the concentration a of the coating agent and the surface tension b (dyne/cm) of the coating composition satisfy the following relationship $$b \leq (-a/15) + 26.$$

Through the concentration a of the coating agent and the surface tension b of the coating composition satisfying the above relationship, even in the case that projections or foreign bodies are present on the surface to be coated, these can be concealed by the coating layer and hence a highly smooth surface can be formed. Regarding the above relationship, if $b > (-a/15) + 26$, then not only will the above effect be poor, but moreover a problem of a reduction in the working efficiency for the coating composition being brought about will arise.

By applying the coating composition described above onto a desired substrate and curing, a coating layer, if desired a hard coating layer, having high surface smoothness can be formed on the surface of the substrate. Examples of the substrate subjected to the coating include plastic products such as plastic films, plastic sheets and plastic plates, and also metal products, glass products, stone and so on.

Coating Film

In the present embodiment, description will be given taking a hard coating film for protecting an information recording layer of an optical disc as an example of the coating film, but the coating film of the present invention is not limited to this usage.

As shown in FIG. 1, the hard coating film 1 according to the present embodiment comprises a protective film 11, and a hard coating layer 12 formed on one surface of the protective film 11.

It is preferable for the protective film 11 to have a sufficient optical transparency in a wavelength region of light for reading or writing information, to have suitable degrees of rigidity and flexibility so that the optical disc can be manufactured easily, and moreover to be stable to temperature for storage of the optical disc. As such a protective film 11, an optically transparent film having as a principal component thereof a polycarbonate, a cycloolefin polymer or polymethyl methacrylate is preferable, with a film having as a principal component thereof a polycarbonate which has high adhesiveness to the hard coating layer 12 described below being particularly preferable. Note that in the case of using a film having a cycloolefin polymer as a principal component thereof, it is preferable to subject the surface on which the hard coating layer 12 is to be formed to corona discharge treatment so as to improve the adhesiveness to the hard coating layer 12.

The thickness of the protective film 11 is set in accordance with the type of the optical disc and the thickness of other constituent parts of the optical disc, but is generally approximately 25 to 300 μm, preferably approximately 50 to 200 μm.

The protective film 11 is generally manufactured by casting a solution that has been obtained by diluting a desired resin with a solvent onto a belt to form a film; projections 10 may often be formed on the surface of the protective film 11, and moreover projections 10 may be formed through foreign bodies being attached to the protective film 11. The height of such projections 10 is generally approximately 0.1 to 10 μm.

The hard coating layer 12 is formed by applying a coating composition as described earlier, preferably a coating composition containing a filler, onto the surface of the protective film 11 and curing.

The application of the coating composition may be carried out using an ordinary method, for example bar coating, knife coating, roll coating, blade coating, die coating, or gravure coating. After the application of the coating composition, the coating film is preferably dried at approximately 50 to 120° C.

The curing of the coating composition can be carried out by irradiating the coating film of the coating composition with ionizing radiation. As the ionizing radiation, in general ultraviolet rays, electron rays or the like are used. The ionizing radiation irradiation amount varies according to the type of the ionizing radiation, but, for example, in the case of ultraviolet rays, approximately 100 to 500 mJ/cm$^2$ in terms of the amount of radiation is preferable, and in the case of electron rays, approximately 10 to 1000 krad is preferable.

The thickness of the hard coating layer 12 is preferably at least h+1 (μm) where h (μm) is the maximum height of the projections 10. As a result, the projections 10 can be reliably concealed, and hence a very high surface smoothness can be obtained. There are no particular limitations on the upper limit of the thickness of the hard coating layer 12, but to prevent warping of the hard coating film 1 obtained, this upper limit is preferably made to be not more than 20 μm, particularly preferably not more than 10 μm.

Because the hard coating film 1 according to the present embodiment has the hard coating layer 12 obtained by curing the coating composition as described above, even in the case that projections 10 are present on the surface of the protective film 11, these projections 10 can be concealed and hence high surface smoothness can be obtained.

Figure 2:
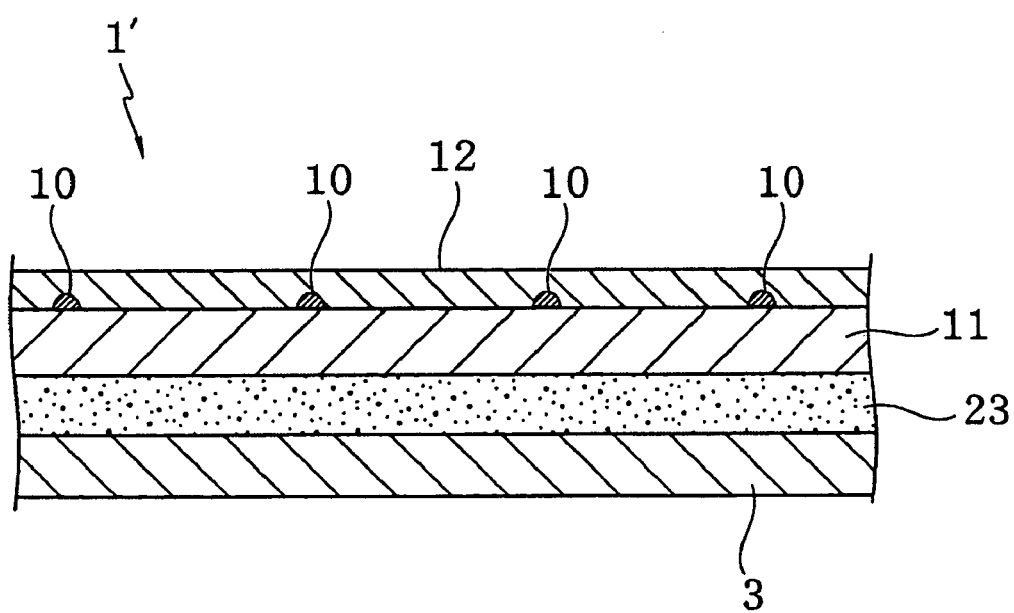
FIG. 2 is a sectional view of a hard coating film according to another embodiment of the present invention.

The hard coating film 1 according to the present embodiment comprises the protective film 11 and the hard coating layer 12, but as with the hard coating film 1' shown in FIG. 2, an adhesive layer 23 may be formed on the opposite surface of the protective film 11 to the hard coating layer 12, and a release sheet 3 may be further formed on the adhesive layer 23.

There are no particular limitations on the type of an adhesive constituting the adhesive layer 23 so long as the optical disc can be formed; for example, the adhesive may be a pressure-sensitive adhesive or curable pressure-sensitive adhesive of an acrylic type, a polyester type, a urethane type, a rubber type, a silicone type or the like, or an adhesive that is ionizing radiation-curable, thermosetting, thermoplastic or the like.

The thickness of the adhesive layer 23 is generally approximately 5 to 100 μm, preferably approximately 10 to 30 μm.

As the release sheet 3, a conventional publicly known one can be used; for example, one obtained by subjecting a film of a resin such as polyethylene terephthalate or polypropylene to release treatment with a silicone release agent or the like can be used.

Optical Disc

Figure 3:
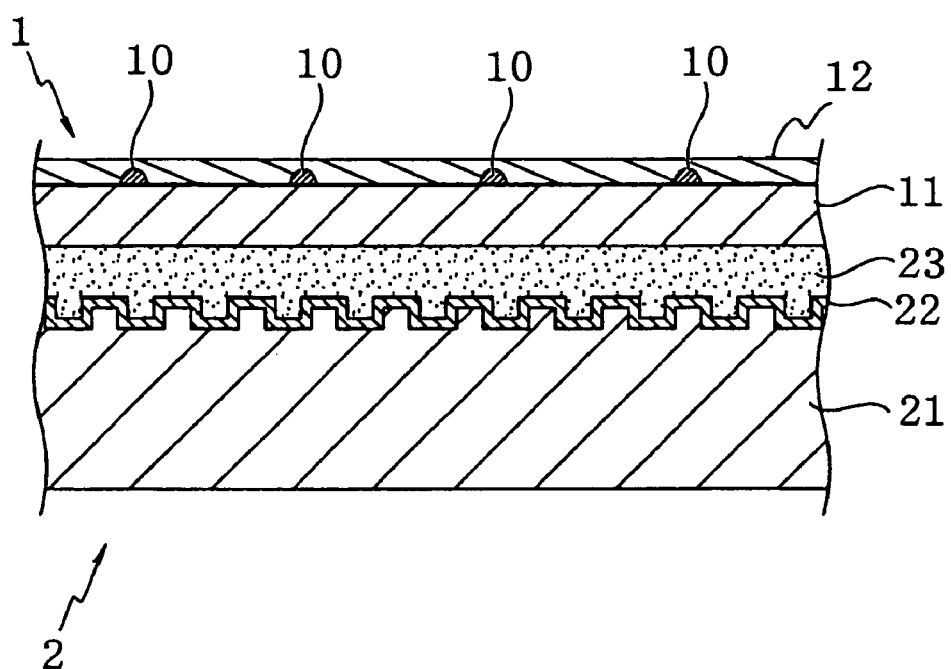
FIG. 3 is a sectional view of an optical disc according to an embodiment of the present invention.
Figure 4:
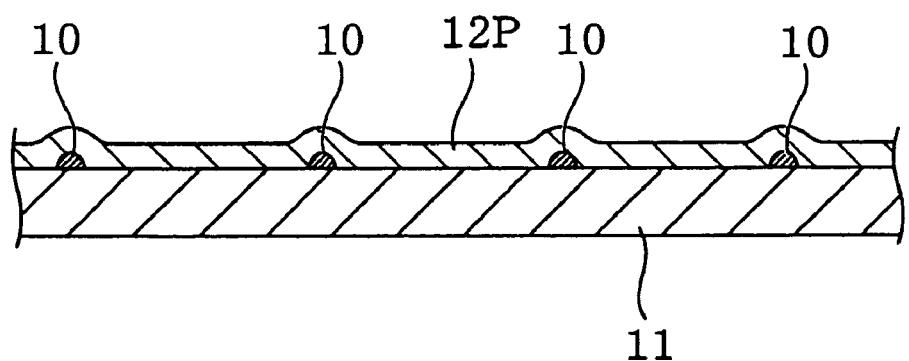
FIG. 4 is a sectional view of a conventional hard coating film.

As shown in FIG. 3, an optical disc 2 according to the present embodiment comprises an optical disc substrate 21 having thereon an concavity-convexity pattern (pits or grooves/lands), an information recording layer 22 formed on the concavity-convexity surface of the optical disc substrate 21, an adhesive layer 23 formed on the information recording layer 22, a protective film 11 formed on the adhesive layer 23, and a hard coating layer 12 formed on the protective film 11.

Such an optical disc 2 can be manufactured, for example, using a method such as the following.

(1) An adhesive such as an ionizing radiation-curable adhesive is applied onto the rear surface (the surface on which the hard coating layer 12 is not present; likewise hereinafter) of the hard coating film 1 or onto the information recording layer 22 formed on the concavity-convexity surface of the optical disc substrate 21, and the hard coating film 1 and the information recording layer 22 are bonded together.

(2) A pressure-sensitive adhesive layer (pressure-sensitive adhesive sheet) comprising a pressure-sensitive adhesive of an acrylic type, a polyester type, a urethane type, a rubber type, a silicone type or the like having a release sheet thereon is stuck onto the rear surface of the hard coating film 1 or the information recording layer 22 formed on the concavity-convexity surface of the optical disc substrate 21, the release sheet is peeled off, and the hard coating film 1 and the information recording layer 22 are bonded together via the pressure-sensitive adhesive layer thus exposed.

(3) The release sheet 3 of the hard coating film 1' is peeled off to expose the adhesive layer 23, and this adhesive layer 23 and the information recording layer 22 formed on the concavity-convexity surface of the optical disc substrate 21 are bonded together.

With the optical disc 2 according to the present embodiment, projections 10 present on the hard coating layer 12 side of the protective film 11 are concealed by the hard coating layer 12, and hence the optical disc 2 (hard coating layer 12) has high surface smoothness; there is thus no deterioration of signal characteristics due to the projections 10, and hence the error rate is very low.

Note that the optical disc 2 according to the present embodiment is of a single-sided one-layer type, but there are no particular limitations on the form of the optical disc, which may also be a single-sided two-layer type.

EXAMPLES

Following is a more detailed description of the present invention through examples and so on; however, the scope of the present invention is not limited by these examples and so on.

Example 1

100 parts by weight of a urethane acrylate type prepolymer (made by Arakawa Chemical Industries, Ltd., trade name 'Beamset 575CB', solid concentration 100 wt %, contains photopolymerization initiator) as an ionizing radiation-curable compound, and 5 parts by weight of a dimethylsiloxane compound (made by BYK-Chemie Japan, trade name 'BYK-300', solid concentration 52 wt %) were mixed together to produce a coating agent, and propylene glycol monomethyl ether was further added as a solvent, thus preparing a coating composition having a coating agent concentration (a) of 15, 35 or 60 wt %. The content of the dimethylsiloxane compound in the coating agent was 2.5 wt %. The surface tension of each coating composition obtained was measured using a surface tensiometer (made by Kyowa Interface Science Co., Ltd., trade name 'CBVP-A') (likewise hereinafter). The surface tension measurement results are shown in Table 1.

Each of the coating compositions was applied using a bar coater such that the thickness of the coating layer after drying would be 5.5 μm onto a surface having thereon projecting defects of a polycarbonate film (made by Teijin Chemicals Ltd., trade name 'Pureace C110-75', thickness 75 μm) having thereon countless projecting defects of maximum height 4.1 μm, drying was carried out for 1 minute at 70° C., and then irradiation was carried out with ultraviolet radiation (irradiation conditions: intensity 310 mW/cm$^2$, amount of radiation 300 mJ/cm$^2$), thus manufacturing a hard coating film (coating film) having a hard coating layer.

Example 2

25 parts by weight of a urethane acrylate type prepolymer (made by Arakawa Chemical Industries, Ltd., trade name 'Beamset 575CB', solid concentration 100 wt %, contains photopolymerization initiator) and 100 parts by weight of reactive particles (made by JSR, trade name 'Desolite Z7524', solid concentration 75 wt %) as ionizing radiation-curable compounds, and 5 parts by weight of a dimethylsiloxane compound (made by BYK-Chemie Japan, trade name 'BYK-300', solid concentration 52 wt %) were mixed together to produce a coating agent, and propylene glycol monomethyl ether was further added as a solvent, thus obtaining a coating composition having a coating agent concentration (a) of 15, 35 or 60 wt %. The content of the dimethylsiloxane compound in the coating agent was 2.5 wt %. The results of measuring the surface tension of each coating composition obtained are shown in Table 1.

Using each of the coating compositions, a hard coating film (coating film) was produced as in Example 1.

Example 3

Coating compositions were prepared as in Example 1, except that the 5 parts by weight of the dimethylsiloxane compound in Example 1 was changed to 1 part by weight of a fluoro compound (made by Dainippon Ink and Chemicals, Inc., trade name 'MEGAFAC F-470', solid concentration 100 wt %). The content of the fluoro compound in the coating agent was 1.0 wt %. The results of measuring the surface tension of each coating composition obtained are shown in Table 1.

Using each of the coating compositions, a hard coating film (coating film) was produced as in Example 1.

Example 4

Coating compositions were prepared as in Example 1, except that the amount of the dimethylsiloxane compound in Example 1 was made to be 2.94 parts by weight, and 0.5 parts by weight of a fluoro compound (made by Dainippon Ink and Chemicals, Inc., trade name 'MEGAFAC F-470', solid concentration 100 wt %) was further added. The content of the dimethylsiloxane compound in the coating agent was 1.5 wt %, and the content of the fluoro compound was 0.5 wt %. The results of measuring the surface tension of each coating composition obtained are shown in Table 1.

Using each of the coating compositions, a hard coating film (coating film) was produced as in Example 1.

Example 5

Coating compositions were prepared as in Example 1, except that the solvent was made to be isobutanol. The results of measuring the surface tension of each coating composition obtained are shown in Table 1.

Using each of the coating compositions, a hard coating film (coating film) was produced as in Example 1.

Example 6

Hard coating films (coating films) were produced as in Example 1, except that each of the coating compositions obtained in Example 1 was applied on such that the thickness of the coating layer after drying would be 4.5 μm.

Comparative Example 1

Coating compositions were prepared as in Example 1, except that the amount of the dimethylsiloxane compound was made to be 0.15 parts by weight. The content of the dimethylsiloxane compound in the coating agent was 0.078 wt %. The results of measuring the surface tension of each coating composition obtained are shown in Table 1.

Using each of the coating compositions, a hard coating film (coating film) was produced as in Example 1.

Comparative Example 2

Coating compositions were prepared as in Example 3, except that the amount of the fluoro compound was made to be 0.05 parts by weight. The content of the fluoro compound in the coating agent was 0.05 wt %. The results of measuring the surface tension of each coating composition obtained are shown in Table 1.

Using each of the coating compositions, a hard coating film (coating film) was produced as in Example 1.

Test Example

The number of defects (projections due to projections on the polycarbonate film) present on the surface of each hard coating film produced in the Examples and Comparative Examples was counted, and was converted into the number of defects over the surface area of one surface of an optical disc (436 cm²). The defects counted were made to be ones having a diameter of at least 100 μm, and the counting was carried out using a confocal microscope (made by Lasertech Corporation, HD100D). The results are shown in Table 1.

TABLE 1

|  | b (dyne/cm) | | | Number of defects |
|---|---|---|---|---|
|  | a: 15 wt % | a: 35 wt % | a: 60 wt % |  |
| Example 1 | 23.0 | 21.7 | 21.0 | 0 |
| Example 2 | 23.2 | 21.6 | 19.6 | 0 |
| Example 3 | 24.5 | 23.0 | 21.2 | 0 |
| Example 4 | 23.1 | 21.8 | 21.2 | 0 |
| Example 5 | 22.3 | 22.6 | 21.8 | 0 |
| Example 6 | 23.0 | 21.7 | 21.0 | 20 |
| Comparative Example 1 | 27.0 | 27.4 | 27.2 | 400 |
| Comparative Example 2 | 25.8 | 24.0 | 22.8 | 300 |

As is clear from Table 1, defects of diameter at least 100 μm were not seen at all for the hard coating films produced in Examples 1 to 5, and there were very few such defects for the hard coating films produced in Example 6.

INDUSTRIAL APPLICABILITY

A coating composition of the present invention is suitable for forming a hard coating layer on a desired substrate, in particular a resin film, and a coating film of the present invention is suitable as a protective film for an optical product, in particular an optical recording medium.

The invention claimed is:

1. A coating composition containing a coating agent having an ionizing radiation-curable compound as a principal component thereof and a solvent, the coating composition having the following property:

under the following condition for the concentration a (wt %) of said coating agent in the coating composition $0 < a < 60$, the concentration a of said coating agent and the surface tension b (dyne/cm) of the coating composition satisfy the following relationship $b \leq (-a/15) + 26$, and said coating agent containing inorganic oxide particles to which an organic compound is bonded, the organic compound having the following formula:

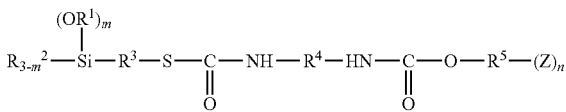

wherein $R^1$ and $R^2$ are each a hydrogen atom or an alkyl group or aryl group having 1 to 8 carbon atoms, and may be the same or different; and m is an integer of 1 to 3;

$R^3$ is a bivalent organic group having an aliphatic or aromatic structure with 1 to 12 carbon atoms, and may contain a chain, branched or cyclic structure;

$R^4$ is a bivalent organic group having a molecular weight of 14 to 10,000;

$R^5$ is an organic group of valency n+1, and n is an integer from 1 to 20; and

Z is a monovalent organic group having in the molecule thereof a polymerizable unsaturated group that is able to undergo an intermolecular crosslinking reaction under the presence of an active radical species.

* * * * *